United States Patent [19]

Bounini

[11] 4,360,386
[45] Nov. 23, 1982

[54] TREATING CALCINED GYPSUM WITH SOLUBILIZING AGENT

[75] Inventor: Larbi Bounini, Hanover Park, Ill.

[73] Assignee: United States Gypsum Company, Chicago, Ill.

[21] Appl. No.: 251,425

[22] Filed: Apr. 6, 1981

[51] Int. Cl.$^3$ .................. C04B 11/00; C01F 5/42
[52] U.S. Cl. .................. 106/110; 423/171; 423/555; 156/39
[58] Field of Search .............. 106/109, 110, 111, 315; 423/170, 171, 172, 555; 156/39

[56] References Cited

U.S. PATENT DOCUMENTS

| B 456,148 | 1/1976 | Schneller | 106/315 |
|---|---|---|---|
| 1,868,372 | 7/1932 | Swift | 106/315 |
| 2,177,668 | 11/1939 | Marsh et al. | 423/172 |
| 2,390,138 | 12/1945 | Vallandigham | 106/315 |
| 2,695,850 | 11/1954 | Lorenz | 106/315 |
| 3,415,910 | 12/1968 | Kinkade et al. | 423/555 |
| 3,770,468 | 11/1973 | Knauf et al. | 106/110 |
| 4,117,070 | 9/1978 | O'Neill | 106/110 |
| 4,153,373 | 5/1979 | O'Neill | 106/110 |
| 4,201,595 | 5/1980 | O'Neill | 106/110 |
| 4,252,568 | 2/1981 | Bounini | 106/111 |

FOREIGN PATENT DOCUMENTS 553519 3/1928 Fed. Rep. of Germany.

Primary Examiner—Gary P. Straub
Attorney, Agent, or Firm—Kenneth E. Roberts; Robert H. Robinson; Samuel Kurlandsky

[57] ABSTRACT

A process for producing a healed stucco of low water demand is disclosed in which calcined gypsum is treated with an aqueous solution of a gypsum solubilizing agent, preferably in an impacting blender while grinding the calcined gypsum to increase its surface area. The product can be dried for storage or sent directly to forming gypsum board.

7 Claims, 7 Drawing Figures

A – Control – 3% H$_2$O
B – 3% Sat. Ca(OH)$_2$ Solution
C – 3% 0.1 M NaOH Solution
D – 3% 0.2 M NaOH Solution
E – 3% 0.5 M NaOH Solution

AGE OF TREATED CALCINED GYPSUM, MIN.

4,360,386

TREATING CALCINED GYPSUM WITH SOLUBILIZING AGENT

BACKGROUND OF THE INVENTION

1. Field of the Invention

This invention relates to a process for treating calcined gypsum (such as calcium sulfate hemihydrate or stucco) for use in gypsum board manufacture and in making bagged industrial plasters.

More particularly the present invention relates to improvements in those processes in which continuously calcined gypsum stucco is rapidly treated with a small amount of water and allowed to heal so as to lower the high water demand for mixing stucco to produce a fluid slurry suitable for casting and subsequent hydration to gypsum dihydrate.

2. Description of the Prior Art

U.S. Pat. Nos. 4,117,070; 4,153,373 and 4,201,595 describe various apparatus and processes for the rapid water treatment and healing of stucco so as to lower the water demand of the material. Each of these processes teaches a "healing time" which must be allowed so that the small amount of free water blended onto the surface of the particles may fuse the crystallite fragments and fissures in the stucco particles to resist subsequent rapid disintegration into micron sized fractions upon the subsequent mixing of the treated material with gauging water.

Recently issued U.S. Pat. No. 4,238,455 relates to a further improvement; disclosing an apparatus for combining the rapid water treatment step with a grinding step to increase the surface area of the treated particles and redevelop stucco activity while blending the water and stucco. This process also calls for a healing time before the treated material may be mixed with water for casting and hydration to gypsum dihydrate.

Further, recently issued U.S. Pat. No. 4,252,568 discloses an improvement wherein the calcined gypsum is treated with a lignin solution rather than plain water; but again a healing time is required in the treatment.

All of the above processes necessitate a holding time during which the treated stucco particle is healed. To insure that full healing has been obtained, about 5 to more than 20 minutes waiting time is required before the treated material acquires the beneficial properties of reduced mixing water demand through a healing of the crystal's surface. This requires that means be used to provide for the healing time; as by additional conveyors, holding bins and the like. In addition a water blender and a grinding mill may be required. The water blender, delay screw conveyors and grinding mill are vented, jacketed and heated to prevent steam condensation on the walls of the equipment when the treatment water contacts relatively hot stucco. Therefore these processes require high initial capital investment and high maintenance costs. U.S. Pat. No. 4,238,445 offers a process that reduces capital investment by combining the treatment step with the grinding step and thereby eliminate a separate water blender. However a delay time is still required and the problems of handling the treated damp stucco remain. Substantial savings could be realized e.g., in capital investment, maintenance, and operating costs in handling damp treated stucco if the healing time could be substantially shortened or eliminated.

SUMMARY OF THE INVENTION

Thus there is a need to further improve the processes for rapidly water treating calcined gypsum to provide lowered mixing water demand. A primary objective and advantage of the present invention is to greatly shorten, or virtually eliminate, the delay time following rapid water treatment before the calcined gypsum may be used. Another object and advantage is to eliminate much of the space, equipment and operating costs involved in rapid water treatment.

In one preferred embodiment of the present invention, the above objects and advantages and others were accomplished by rapidly treating the calcined gypsum in an impacting blender using a dilute solution of gypsum solubilizing agent instead of plain water, thereby blending the solution with the calcined gypsum while grinding it to increase surface area. The treated material may be used immediately, requiring only a fraction of the prior necessary healing time. Preferred apparatus for the treatment comprises an impact mill having an entry port and exit port for the calcined gypsum, an impact zone wherein the calcined gypsum is ground, and a conduit for directing a dilute aqueous solution of gypsum solubilizing agent to the impact zone.

BRIEF DESCRIPTION OF THE DRAWINGS

The invention is exemplified in the attached drawings in which the

DESCRIPTION OF THE PREFERRED EMBODIMENTS

Figure 1:
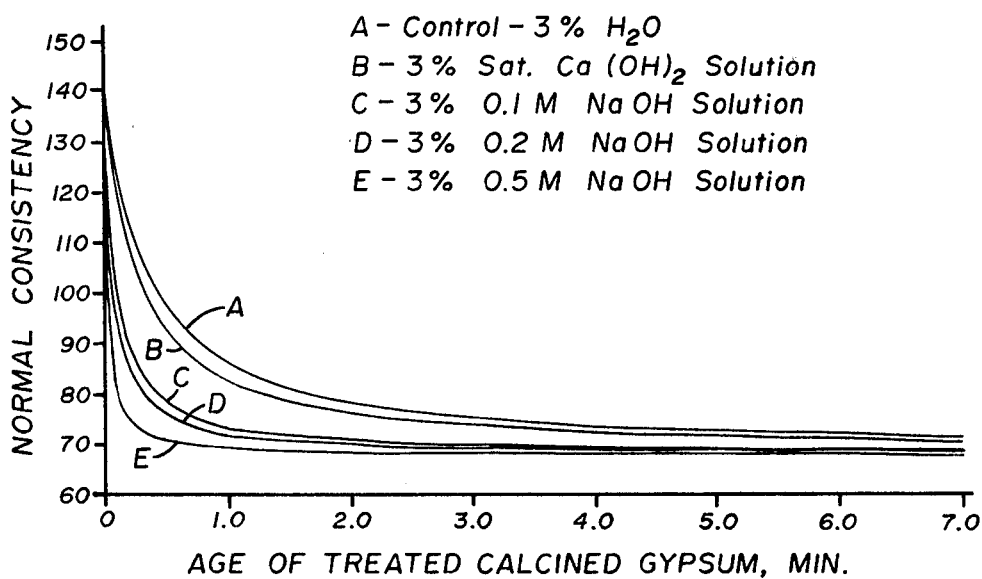
FIGS. 1–7 graphically show the effect on dispersed consistency of calcined gypsum with time from treatment using various chemical solutions.

Heretofore, it has not been appreciated that the solubility of calcium sulfate hemihydrate plays a role in the rapid water treatment of the calcined gypsum. While I do not want to be bound by any particular theory of operation, it appears that when the small amounts of water are added, this water becomes supersaturated with locally solubilized hemihydrate and acts as a medium for mass transfer between high energy areas, such as sharp points or edges of the stucco particle and low energy areas such as narrow tips of cracks in the particle. Ordinarily, calcined gypsum particles are composed of hundreds of hemihydrate fragments loosely held together. Upon addition of sufficient gauging water to obtain a fluid mix and upon subsequent agitation the stucco particles disintegrate along fissures and other weak points into smaller fragments. I believe that when very small amounts of water are intimately and thoroughly blended with calcined gypsum for the rapid water treatment, the rate of healing depends upon the rate of dissolution of calcium sulfate from high points or protrusions on the particle and the rate of transfer of the calcium and sulfate ions from these higher energy areas to crevices, fissures and other weak points in the particle. These two rates are themselves highly dependent upon concentration of calcium and sulfate ions in the water on the surface of the particle. The lower the concentration at which that water becomes saturated with calcium and sulfate ions, then the slower is the healing process.

Accordingly it has now been found that the healing time can be accelerated or eliminated by applying to the surface of the particle a solution of gypsum solubilizing agent. Such materials are well known to those skilled in the art and generally include inorganic acids, bases and salts that are strong electrolytes. While any gypsum solubilizing material may be used, it is preferred that particular ones be selected from this group for their strong solubilizing effects, minimum adverse effects on the hydration characteristics of the calcined gypsum, and minimum adverse effects on properties of those products in which the treated calcined gypsum is to be used. For example, if the calcined gypsum is subsequently used to make gypsum board having paper cover sheets, materials which interfere with paper-core bonding should be avoided. Further, materials which interfere with the action of other additives for purposes such as set control, additional binding and the like should be avoided for preferred results.

Thus a suitable solubilizing agent for use in the present invention may include for illustration, alkaline earth metal hydroxides such as sodium hydroxide, potassium hydroxide, calcium hydroxide or barium hydroxide; inorganic acids such as hydrochloric acid, nitric acid, sulfuric acid, or chromic acid; and basic or acidic salts such as sodium nitrate, nitrite, or carbonate; potassium chloride or nitrate; ammonium chloride, nitrate, or carbonate; or mixtures thereof. Highly preferred materials, which provide effective acceleration of the healing time at such low amounts as not to interfere with other additives or constituents and subsequent processing properties include potassium hydroxide, sodium hydroxide, nitric acid, sodium nitrate and nitrite, chromic acid and the like. Other gypsum solubilizing agents such as boric acid, phosphoric acid, Rochelle salt, sodium chloride, borax, magnesia, ammonium oxylate and others well known to those skilled in the art may be used but are not preferred generally because of lower solubilizing effects and more adverse effects on hydration.

The hemihydrate solubilizing agents may be incorporated in the rapid water treatment of the calcined gypsum in any suitable manner. It is preferred for economy that they be introduced as aqueous solutions and, particularly, in the simultaneous water blending and grinding process. The materials may however be added either in solid or solution form in any of the other processes for rapid water treatment of the calcined gypsum and will result in substantial reduction to elimination of the healing time. Depending on the activity of the particular solubilizing agent and the amount of healing time that can be tolerated or is desired, generally from 0.01 to 5 and more particularly 0.1-1.0 molar amounts of solubilizing agent will be present in the treating water that is added in customary amounts for the particular stucco, e.g., 1-10% water by weight of the stucco.

The following examples will illustrate various specific embodiments of the process of the present invention. Of course, it is to be understood the examples are by way of illustration only, and in no way are to be construed as limitations on the present invention.

EXAMPLE 1

In each of seven different tests, approximately 2,000 gram batches of different continuously air calcined beta hemihydrate stuccos were treated at room temperature with optimum amounts of water for the particular calcined gypsum and with various materials in solution. The normal consistency, or water demand, at various ages of the treated stucco was determined at strictly controlled time intervals measured from the time of treatment to the time of test. The results define the curves plotted in FIGS. 1-7 generally indicating that normal consistency is drastically reduced at very early ages as the concentration of the solution of gypsum solubilizing agent is increased.

As more specifically shown in FIG. 1, a stucco having an untreated working normal consistency of 147 (147 grams of gauging water per 100 grams of stucco to get a 17.50 seconds flow time through a standard Ford cup consistometer) was given an optimum water treatment of 3% water for that particular stucco. The treatment resulted in a normal consistency of, for example, 75 at 2.50 minutes age. In comparison, treatment with varying amounts of sodium hydroxide, a solubilizing material for calcined gypsum, shows more effective and more rapid treatment; and further shows the effectiveness increasing rapidly with increasing concentrations. That is, the same normal consistency was achieved respectively in about 45 seconds at 0.1 molar (line c in FIG. 1), about 30 seconds at 0.2 molar (line D) and about 12 seconds at 0.5 molar (line E). Not shown in the figure, increasing the concentration of sodium hydroxide to 5 molar showed the same trend. Calcium hydroxide also accelerated the aging; but, because a saturated solution of calcium hydroxide contains only a low concentration of dissolved materials, it is not as efficient or effective as sodium hydroxide.

Figure 2:
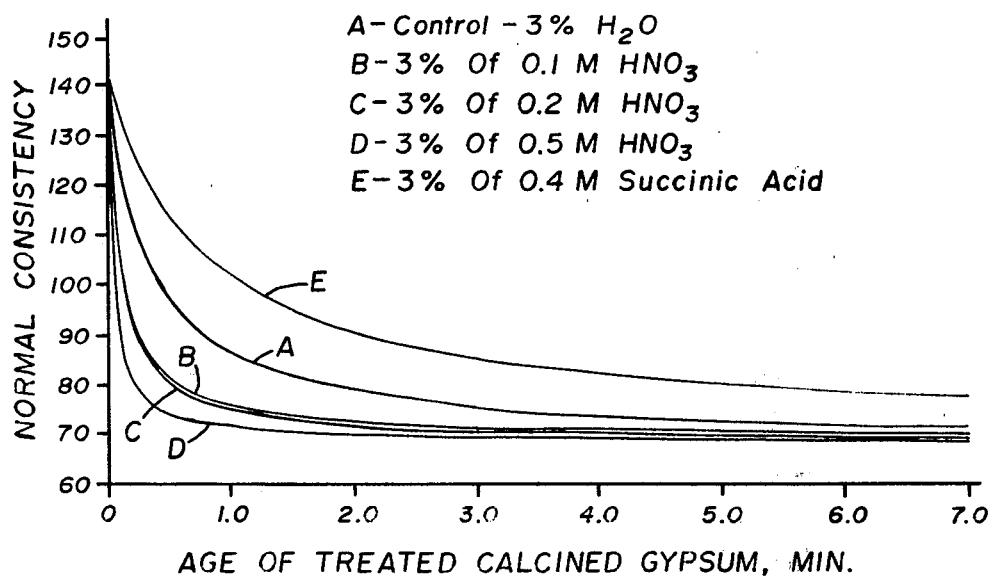

FIG. 2 depicts the highly efficient rapid acceleration of aging with nitric acid using the same calcined gypsum as used in obtaining the results depicted in FIG. 1. In comparison, nitric acid appears to be not as effective as sodium hydroxide. While there was little difference between 0.1 molar and 0.2 molar (lines B and C), increasing efficiency is being obtained at 0.5 molar nitric acid solution (line D). Also, it is apparent from the change between 0.2 molar solution of nitric acid (line C) and 0.5 molar solution of nitric acid (line D) that further increasing concentrations of nitric acid would increase the rate of aging of this particular calcined gypsum. Further, for comparison, succinic acid being a surface active agent but not an effective gypsum solubilizing material appears to retard the aging by creating a barrier for mass transfer between the solution and the solid phases (line E). Glycerin, not shown in the figures, is another material that decreases solubility of calcined gypsum similar to succinic acid.

Figure 3:
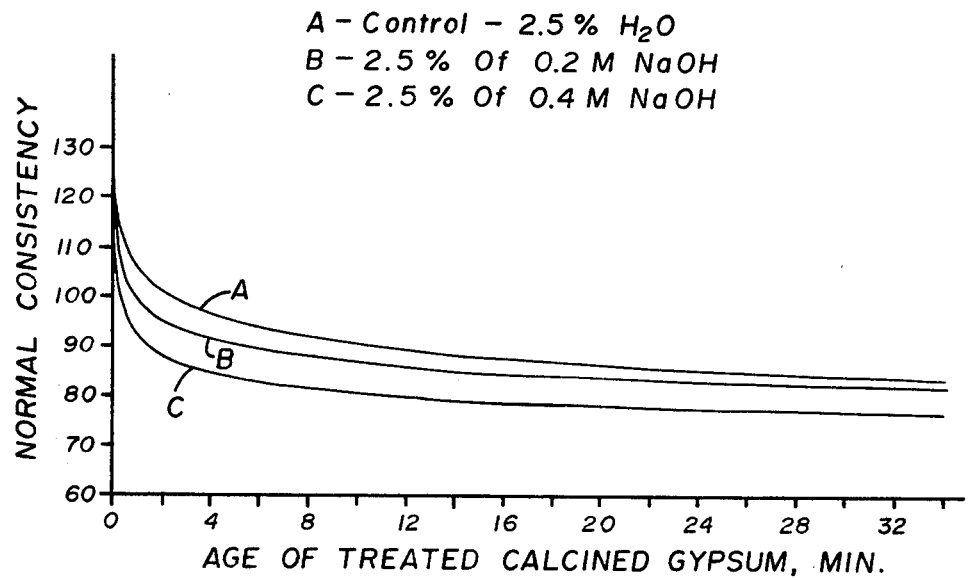

FIG. 3 depicts the results with sodium hydroxide and a different stucco. Treating this stucco with the optimum amount of water alone produced a normal consistency of 85 at 25 minutes aging. The sodium hydroxide shows a pattern of behavior here that is similar to the results depicted in FIG. 1. With this particular stucco there was a greater lowering of consistency in the general time frame and a more rapid accelerating of the aging within that time frame with the sodium hydroxide; e.g., a working normal consistency of 85 was obtained in 15 minutes at 0.2 molar solution of sodium hydroxide and in less than 3 minutes with 0.4 molar. With a 7 minute aging time, the optimum water treatment produced a stucco of about 96 normal consistency, whereas the 0.4 molar solution of sodium hydroxide at that time had reduced the consistency to about 87.

Figure 4:
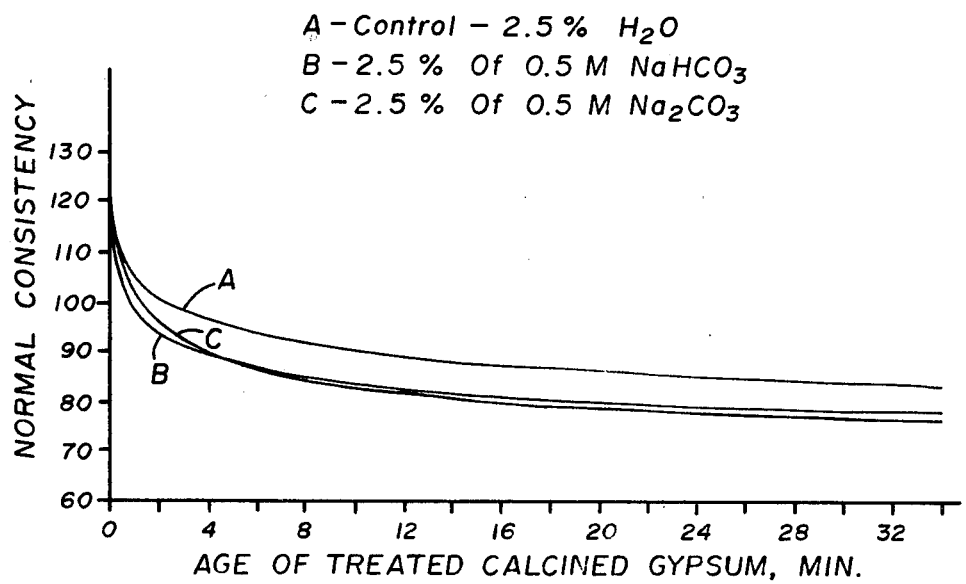
Figure 5:
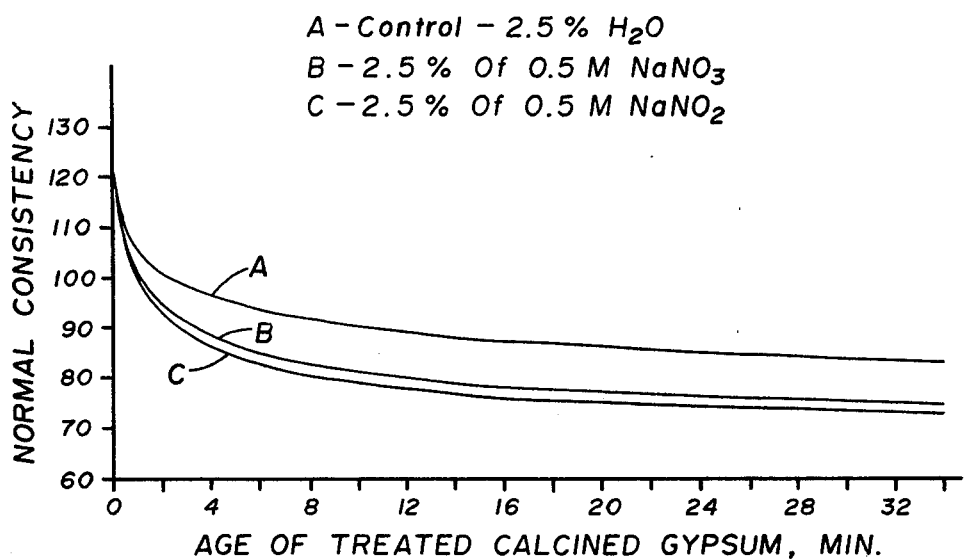

FIGS. 4 and 5 depict results obtained respectively with sodium bicarbonate and sodium carbonate; and with sodium nitrate and sodium nitrite. For practical purposes the different chemicals in each of the above classes are equivalent in effectiveness in accelerating the aging of the treated stucco at the concentrations depicted. The nitrates are more effective than the carbonates at individual time frames during the first 30 minutes for this stucco.

Figure 6:
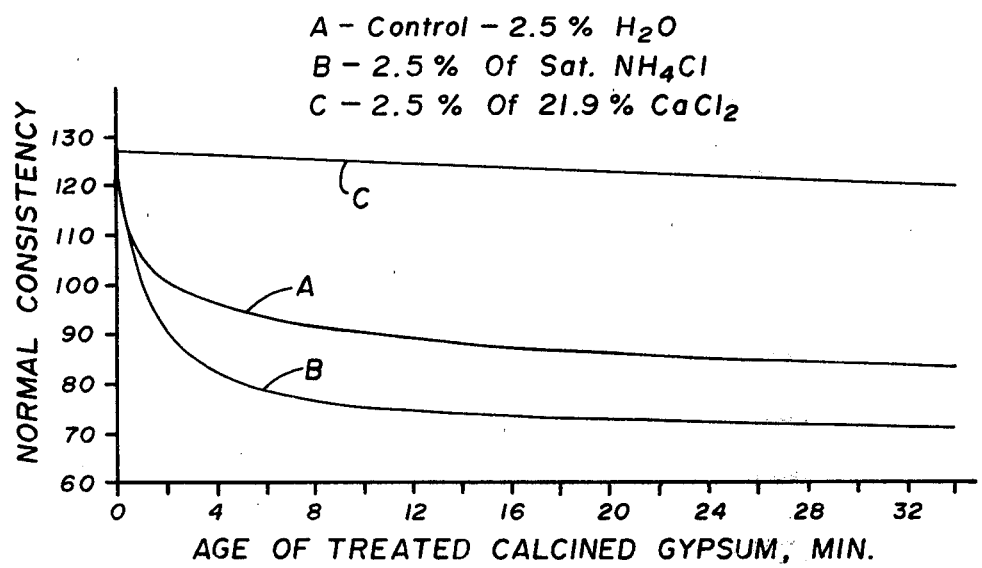
Figure 7:
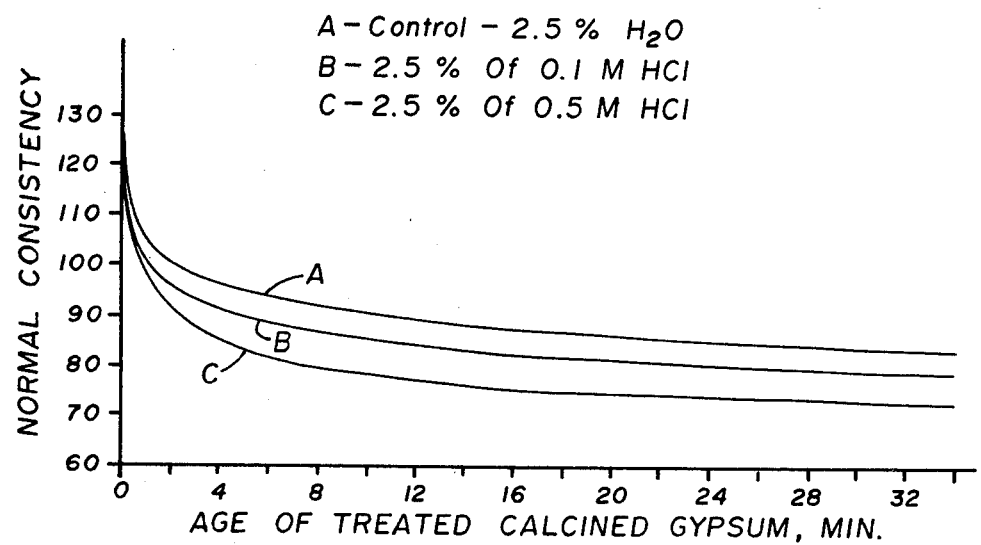

FIG. 6 depicts results obtained with calcium chloride solution and, in comparison, a saturated solution of ammonium chloride. Ammonium chloride is an effective solubilizing agent. Calcium chloride, which is not a solubilizing agent but actually decreases the solubility of hemihydrate, retards the aging of stucco in comparison to the treatment with water only. This FIG. 6, along with FIGS. 1 and 7, illustrate the difficulty in attempting to chemically classify the materials effective for use in this invention. However all of the effective materials are known to increase the solubility of calcined gypsum. In FIG. 6, both compounds are chlorides yet only one is a known solubilizing agent for calcined gypsum and it is effective in accelerating the aging, here the calcium compound not being effective. Yet in FIG. 1 another calcium compound which is a known solubilizing agent for calcined gypsum is effective for accelerating aging of water treated stucco; and in FIG. 7 another chloride which is a known solubilizing agent for calcined gypsum is effective for accelerating aging. Thus there appears to be no readily defined classification by composition to characterize the effective agents of this invention other than their property and ability to solubilize calcined gypsum. Sulfuric acid, not shown in the figures, and hydrochloric acid as depicted in FIG. 7, are basically the same in effectiveness. Both materials, with increasing concentration up to a point will solubilize increasing amounts of calcined gypsum; and then further increases in the concentration of the material will exhibit decreasing capacities to dissolve or solubilize calcined gypsum. Sulfuric acid will act as a solubilizing agent in amounts up to about 20% by weight of sulfuric acid, with maximum solubility at about 10% sulfuric acid; and hydrochloric will accelerate the aging with increasing amounts up about 40% by weight hydrochloric acid solutions, with a maximum solubility at about 10% hydrochloric acid. Chromic acid, not shown in the figures is a solubilizing agent for calcined gypsum and accelerates the aging in accordance with the present invention; however potassium succinate is a surface active agent and retards the aging.

EXAMPLE 2

In a comparative evaluation a gypsum board line was modified in two phases. In the first phase a water blender, delay screw conveyors and impacting grinder were inserted between the stucco supply bins and the slurry board mixer. The freshly calcined stucco used on this line when ground to 11,800 $cm^2/g$ surface area had a normal consistency above 90. In the first run in this phase the stucco was treated with water. Rapidly blending an optimum 3% water with a 4.50–5.0 minute delay time aging in the conveyors and a grinding to 10,800 $cm^2/g$ surface area resulted in a water treated stucco of 73 consistency. Board made from this material had an evaporation of 860 pounds of water per thousand square feet of ½ inch board and satisfactory physical properties e.g., nail pull resistance, paper bond, hardness and strengths.

Then a 0.2 molar solution of sodium hydroxide was fed to the blender instead of plain water. Rapidly blending this solution into the stucco with a 4.5–5.0 minute delay time for aging in the conveyors, and grinding to about 9,500 $cm^2/gm$ surface area resulted in a treated stucco of 68 normal consistency. Board made from this material had an evaporation rate of 788 pounds of water per thousand square feet of board and slightly better nail pull resistance, paper bond and strengths. Thus replacing plain water with a gypsum solubilizing agent solution and keeping all other conditions of rapid treatment the same lowered the amount of water to be evaporated, or lowered slurry fluidity for making gypsum board by about 9%, and improved physical properties of the board.

In the second phase of the evaluation, the water blender and delay conveyors were by-passed so that freshly calcined stucco entered the grinder and passed directly, in less than a minute, to the slurry board mixer. The grinder was modified with a solution feed line and discharge nozzle. Blending in the grinder a quantity of 0.2 molar solution of sodium hydroxide equivalent to 3% by weight of stucco, while grinding to 9,800 $cm^2/g$ surface area resulted in a treated stucco of 71 normal consistency with only 40–45 seconds delay time before entering the slurry mixer. Board made from this material had an evaporation of 800 pounds of water per thousand square feet of board and satisfactory physical properties. Thus replacing plain water with a solution of the invention and providing only a 40–45 seconds healing time reduced the water to be evaporated about 7% without deleterious effect on board properties.

For the above described treatment the calcined gypsum feed may be any product of conventional calcination from any gypsum source including natural rock gypsum, chemical process gypsums and blends thereof. The solubilizing agent may be added singly, in mixtures of such agents or of precursors yielding such agent(s) on reaction in situ in the water and gypsum blending step. The treated stucco may optionally be thereafter combined with conventional additives in customary amounts for use in making gypsum board or industrial building and casting plasters and/or dried as for storage stability.

What is claimed is:

1. A method of treating beta calcium sulfate hemihydrate having an initial high consistency which method comprises treating said hemihydrate with about 1–10 weight % of aqueous medium consisting of water and about 0.01–1 mole per liter of a gypsum solubilizing agent selected from the group consisting of sodium hydroxide, potassium hydroxide, calcium hydroxide, barium hydroxide, hydrochloric acid, nitric acid, sulfuric acid, phosphoric acid, boric acid, chromic acid, sodium chloride, sodium nitrate, sodium nitrite, sodium carbonate, sodium bicarbonate, rochelle salt, potassium chloride, potassium nitrite, ammonium chloride, ammonium nitrate, ammonium carbonate, ammonium phosphate, ammonium oxylate, magnesia, borax, and mixture thereof to achieve an at least about 10% reduction, as compared to treating with water without said solubilizing agent, in dispersed consistency or healing time of the treated hemihydrate.

2. The method of claim 1 in which said aqueous medium is a sodium hydroxide solution.

3. The method of claim 2 in which the hemihydrate is treated with about 2½–3%, by weight of the hemihydrate, of an about 0.1–0.5 molar sodium hydroxide aqueous solution.

4. The method of claim 1 including the steps of mixing said hemihydrate and said aqueous medium in a blender; allowing the blend to heal for about 1–32 minutes; and grinding the hemihydrate to increase the surface area of the treated hemihydrate up to about 4 times.

5. The method of claim 1 including the steps of mixing said hemihydrate and said aqueous medium in an impacting blender while simultaneously or substantially simultaneously grinding the hemihydrate to increase the surface area of the hemihydrate up to about 4 times and allowing the blend to heal for less than 1 minute.

6. The method according to either claim 4 or claim 5 including the steps of conveying the treated hemihydrate to a gypsum slurry mixer; adding additional water to the treated hemihydrate in the slurry mixer to form a fluid, homogeneous slurry; feeding the slurry to a gypsum board making machine to form wet gypsum board; passing the wet gypsum board through a kiln to dry the board; and recovering dry gypsum board.

7. A method of treating a beta hemihydrate having a high initial consistency with about 2½-3%, by weight of the hemihydrate, of an about 0.2 molar aqueous solution of sodium hydroxide to achieve a substantial reduction as compared to treating with water without said solubilizing agent in consistency in less than about 1 minute.

* * * * *